Figure 1:
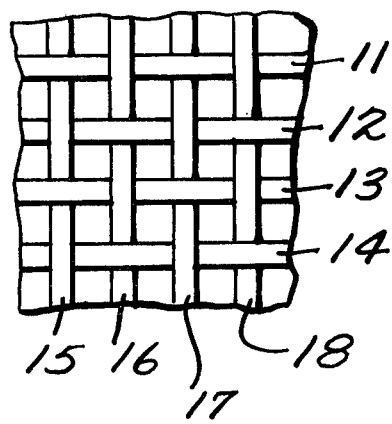

United States Patent [19]
Dubler

[11] 3,931,051
[45] Jan. 6, 1976

[54] CATALYST FOR THE OXIDATION OF AMMONIA

[75] Inventor: Horst Dubler, Grossauheim, Germany

[73] Assignee: Deutsche Gold- und Silber-Scheideanstalt vormals Roessler, Frankfurt, Germany

[22] Filed: Aug. 12, 1974

[21] Appl. No.: 496,811

[30] Foreign Application Priority Data
Aug. 17, 1973 Germany.............................. 2341624

[52] U.S. Cl.............. 252/465; 252/472; 252/477 R; 423/403
[51] Int. Cl.² ...................... B01J 21/04; B01J 23/64
[58] Field of Search................ 252/477 R, 465, 472; 423/403, 404

[56] References Cited
UNITED STATES PATENTS
1,927,963    9/1933    Taylor................................. 423/403

Primary Examiner—W. J. Shine
Attorney, Agent, or Firm—Cushman, Darby & Cushman

[57] ABSTRACT

There is provided a catalyst for the oxidation of ammonia for the production of nitrogen oxides consisting of a gauze packet of platinum-rhodium alloy and non-noble metal alloys in which at least a part of the individual gauzes of the gauze packets contain both wires of platinum-rhodium alloy and also of oxidation resistant, heat resistant non-noble metal alloys.

11 Claims, 2 Drawing Figures

U.S. Patent    Jan. 6, 1976    3,931,051

CATALYST FOR THE OXIDATION OF AMMONIA

The present invention is directed to a catalyst for the oxidation of ammonia for the production of nitrogen oxides for the production of nitric acid consisting of a gauze packet which contains wires of noble metal and non-noble metal alloys.

The nitrogen oxide necessary for the production of nitric acid is obtained by the oxidation of ammonia. In this process there are chiefly used as catalysts platinum-rhodium-alloys. On technological and physical-chemical grounds they are used almost exclusively as standard today in the form of fine mesh gauzes. These are arranged in a reactor in compact packing on the top of each other in amounts up to 50 gauzes, usually there being at least 10 gauzes. This type of formed catalyst gauze system is flowed through by the ammonia-air mixture which has been preheated up to 250°C. Thereby there occurs the reaction to form nitrogen oxide and steam with large positive evolution of heat. The yield of nitrogen oxides ranges between 90 and 98%.

As a result of the thermal process occurring on the catalyst this takes on a temperature between 820° and 950°C. during the oxidation process. The gauzes are subjected therewith during their time of operation to a considerable thermal stress on which there is superimposed in high pressure plants a considerable mechanical load. From this there results a considerable wear and tear which in combination with the high loss of platinum and rhodium (the cause of which is still not clear) occurring during the reacting makes necessary a frequent change and reworking of the catalyst gauzes.

Since for some years the art has continued to use greater pressures and higher temperatures in the burning of ammonia this means that the time between two gauze changes is reduced and therewith the down time of the plant increased This fact allows to be disregarded all previous efforts which have the object of reducing the amount of platinum-rhodium-catalyst added and/or the loss of the same and/or the effecting of an improvement of the yield of nitrogen oxides. Sometimes in regard to the useful life of the gauzes this point of view becomes even counteracting.

Processes are known in which a portion of the catalyst is replaced by regular or irregular netting on non-noble wires which replacement has a favorable influence on the flow and thereofre leads to a reduction of the amount of catalyst and therewith to a reduction of the loss of platinum (German Offenlegungsschrift No. 2,101,188, Gillespie U.S. Pat. No. 3,660,024 and German Offenlegungsschrift No. 2,239,514). A disadvantage of these processes consists of the fact that the added catalyst gauzes of platinum-rhodium must be renewed regularly in quite a short time because of the previously mentioned wear and tear.

Therefore, it was the problem of the present invention to find a catalyst in gauze form which can stand firm as long as possible in the thermal and mechanical wear and tear occuring in the ammonia oxidation and thereby reduce the down time of the combustion plant.

This problem was solved according to the invention by using gauze packets in which all or a part of the individual gauzes of the gauze packet, e.g. 20 to 100% of the individual gauzes contain both wires of a platinum-rhodium-alloy and also wires of an oxidation resistant heat resistant non-noble metal alloy. Some of the individual gauzes in the packet can be free of non-noble metal alloy wires.

The catalyst gauzes of the invention have a significantly longer life than the known catalyst gauzes of platinum-rhodium alloys so that the frequency of changes of gauzes can be reduced in the combustion plants. Simultaneously with the catalyst gauzes of the invention there is an equivalent reduction of the platinum addition compared to the known processes and there is attained therewith a reduction of the loss of this metal.

The gauze fabric is preferably a mixed fabric of platinum-rhodium wires with up to 30% rhodium and non-noble wires of a nonscaling and heat resistant steel. The rhodium can be as little as 3 percent of the platinum-rhodium alloy. The mixed fabric can contain 30 to 90 percent of the platinum-rhodium alloy. The mixed fabric contain 10 to 70 percent of non-noble wires. It is especially advantageous to use a steel containing 20 to 25 percent chromium and 3 to 5 percent aluminum. The diameter of the non-noble metal wires is in the order of magnitude of the noble metal wires, namely 0.06 to 0.15 mm.

It has been found that these non-noble metal wires act as carriers for the interwoven catalyst filaments and therefore make possible a longer use of their catalytic properties. From this quality as well as from the considerable saving in amount of added catalyst and of the loss there results substantial advantages for the process of ammonia combustion in all types of burner.

Advantageously the gauze fabric is so formed that either only the warp fibers or only the weft fibers consist of non-noble metal alloy. In order to lend a still higher life to the catalyst gauzes, however, a part of the warp wires of platinum-rhodium can be replaced by non-noble metal wires, preferably in regular arrangement, and likewise non-noble metal used for the weft fibers. However, exactly as good in this case a platinum-rhodium alloy also can be used for the weft fibers. Furthermore, it is possible to furnish the individual catalyst gauzes of a gauze packet with a different fraction of non-noble metal wires, which can bring about further advantages depending on the type of combustion plant.

By the addition of the catalyst gauzes of the invention, the rate of change of ammonia into nitrogen oxide remains unchanged compared to known catalysts.

Figure 2:
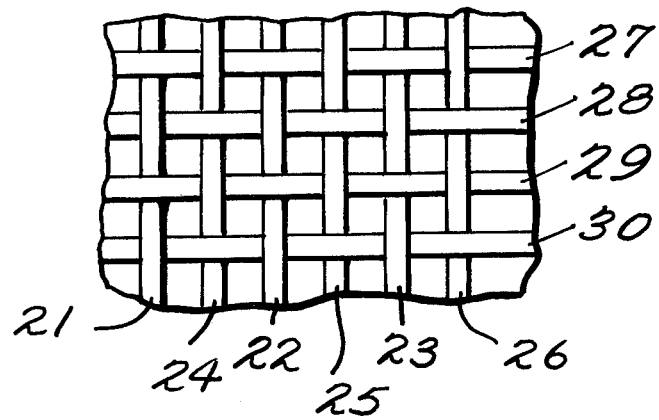

The invention will be understood best in connection with the drawings wherein:

FIG. 1 is a partial schematic representation of one form of gauze packet according to the invention; and FIG. 2 is a similar representation of another form of gauze packet according to the invention.

Referring more specifically to FIG. 1 of the drawings, the warp fibers 11, 12, 13 and 14 consist of a platinum-rhodium alloy (e.g., containing 10% rhodium) and the weft fibers 15, 16, 17 and 18 consist of a non-noble metal alloy, for example an iron alloy containing 20 percent chromium and 5 percent aluminum, balance, iron.

In FIG. 2 the warp fibers 21, 22, 23, 24, 25 and 26 alternatingly consist of platinum-rhodium alloy, fibers 21, 22, and 23 and a non-nobel metal alloy, fibers 24, 25 and 26 while the weft fibers 27, 28, 29 and 30 likewise consist of platinum-rhodium-alloy.

Unless otherwise indicated all parts and percentages are by weight.

The advantages of the invention are further explained by the following examples.

EXAMPLE 1

There were inserted in a 7 atmospheres absolute plant for making nitrogen oxide from ammonia in place of 35 gauzes of platinum alloyed with 10 percent rhodium similar gauzes having about a 50 percent noble metal content; i.e., the weft wires of the gauze fabric consisted of an iron alloy containing 23 percent chromium and 4 percent aluminum. The warp wires were of the Pt 10 Rh alloy. Thereby there was produced at an unchanged reaction of 91 to 93 percent an increase in the operation time between two gauze changes from 60 days to 85 days and thereby the loss of platinum and rhodium was reduced from 1.85 grams/metric ton of ammonia nitrogen to 1.14 grams/metric ton of ammonia nitrogen.

EXAMPLE 2

An increase of working time of the gauze from 180 to 270 days was obtained in a 2.5 atmospheres absolute plant (for making nirogen oxide from ammonia) with a load per unit surface of 5 tons $N/m^2 \times day$ by installation of the gauze of the invention having the composition of Example 1. The platinum lost of 0.66 g/t (metric ton) of ammonia nitrogen with the old type of gauze was thereby reduced to 0.35 g/t (metric ton) of ammonia nitrogen.

EXAMPLE 3

Finally, in a plant for making nitrogen oxide from ammonia operating at 7 atmospheres absolute with a load per unit surface of 22 tons $N/m^2 \times day$ there was produced a running time of 136 days with 25 mixed fabric gauzes according to Example 1 while in contrast under the same operating conditions a Pt 10 Rh gauze could only be used for 90 days. The specific platinum loss amounted to 0.71 $g/N-NH_3$ with the catalyst gauze of the invention in contrast to a loss of about 1.2 $g/N-NH_3$ with the Pt 10 Rh gauze.

Characteristic of all tests there was a savings in platinum addition of about 50 percent, a reduction of the specific noble metal loss of up to 47 percent and an increase of the life of the catalysts gauze of up to 52 percent. These determinations serve substantial industrial advantages in the production of nitrogen oxides by the oxidation of ammonia. Their importance is, therefore, so large because the use of platinum saving processes in plants with working pressures up to 5 atmospheres absolute until now have had limited success in industrial use. The catalyst gauze of the invention in contrast can be added in all types of plants with the described results without problems. In high pressure plants the reduction in loss of platinum and the greater life of the gauzes of the invention are of primary importance since the productivity of the plant is increased.

Instead of the iron alloy with 23 percent chromium and 4 percent aluminum naturally there can be used other non-noble metal alloys which are oxidation resistant and heat resistant under the conditions of the ammonia combustion.

Such alloys are iron alloys with 15 percent chromium and 7 percent aluminium, 20 percent chromium and 5 percent aluminium, 25 percent chromium and 3 percent aluminium, 30 percent chromium and 5 percent aluminium, 18 percent chromium and 2 percent silicon, 25 percent chromium, 4 percent nickel and 1 percent silicon.

What is claimed is:

1. A catalyst gauze packet suitable for use in the oxidation of ammonia to nitrogen oxide wherein 20 to 100 percent of the individual gauzes in the packet consist essentially of wires of platinum-rhodium alloy and wires of an oxidation-resistant, heat-resistant non-noble metal alloy, and the balance of the individual gauzes consist essentially of wires of platinum-rhodium alloy.

2. The catalyst packet according to claim 1, wherein all of the individual gauzes contain both platinum-rhodium alloy wires and the non-noble metal alloy wires.

3. The catalyst packet according to claim 1, wherein some of the individual gauzes are free of non-noble metal alloy wires.

4. The catalyst packet according to claim 1 wherein the non-noble metal alloy is an iron alloy.

5. The catalyst packet according to claim 4 wherein the non-noble metal alloy consists essentially of iron containing 20 to 25 percent chromium and 3 to 5 percent aluminum.

6. The catalyst packet according to claim 1, wherein the non-noble metal wires are present in the warp of the gauze fabric.

7. The catalyst packet according to claim 1, wherein the non-noble metal wires are present in the weft of the gauze fabric.

8. The catalyst packet according to claim 1, wherein the warp of the gauze fabric consists of both wires of platinum-rhodium-alloy and wires of non-noble metal alloy and the weft wires consist of either platinum-rhodium-alloy wires or non-noble metal alloy wires.

9. The catalyst of claim 1 wherein the individual gauzes of the gauze packet have different amounts of non-noble metal wires.

10. The catalyst of claim 1, wherein the platinum-rhodium alloy contains up to 30 percent rhodium.

11. The catalyst of claim 10 wherein the platinum-rhodium alloy contains 10 percent rhodium and the non-noble metal alloy contains 23 percent chromium, 4 percent aluminum and balance iron.

* * * * *